United States Patent [19]

Ahn et al.

[11] Patent Number: 5,582,852

[45] Date of Patent: Dec. 10, 1996

[54] METHOD OF PRODUCING GRANULE TYPE CHEWING GUM

[75] Inventors: Sung A. Ahn, 1-303, Jangmi 3rd Apartment, Shincheon-dong, Songpa-ku, Seoul; Myung H. Yoon, Seoul, both of Rep. of Korea

[73] Assignee: Sung Ae Ahn, Rep. of Korea

[21] Appl. No.: 396,232

[22] Filed: Mar. 1, 1995

[30] Foreign Application Priority Data

Mar. 4, 1994 [KR] Rep. of Korea .......... 94-4216

[51] Int. Cl.$^6$ .................................................. A23G 3/30
[52] U.S. Cl. .................. 426/5; 426/96; 426/453
[58] Field of Search .............. 426/3–6, 96, 453

[56] References Cited

U.S. PATENT DOCUMENTS

| | | | |
|---|---|---|---|
| 3,632,358 | 1/1972 | Echeandia et al. | 426/3 |
| 4,139,589 | 2/1979 | Beringer et al. | 426/5 |
| 4,217,368 | 8/1980 | Witzel et al. | 426/3 |
| 4,370,350 | 1/1983 | Fisher et al. | 426/5 |
| 4,405,647 | 9/1983 | Fisher et al. | 426/5 |
| 4,588,592 | 5/1986 | Elias | 426/5 |
| 4,737,366 | 4/1988 | Gergely et al. | 426/5 |
| 4,753,805 | 6/1988 | Cherukuri et al. | 426/5 |

*Primary Examiner*—Jeanette Hunter
*Attorney, Agent, or Firm*—Hoffman, Wasson & Gitler

[57] ABSTRACT

A method of producing granule type chewing gum without the necessity of using a cutting machine and expensive nitrogen gas for cooling the chewing gum material, departing from the shape of a standardized elongated rectangle. According to the method, hard gum base is melted by heating the gum base in a water bath, and the melted gum base is mixed with other chewing gum materials under predetermined mixing rates and temperatures to produce a mixture of chewing gum. The mixture of chewing gum is then granulated by stirring and solidifying the mixture of chewing gum. Granules of the mixture may be coated with various food materials for various colors and tastes of the products.

3 Claims, No Drawings

METHOD OF PRODUCING GRANULE TYPE CHEWING GUM

BACKGROUND OF THE INVENTION

1. Field of the Invention

The present invention relates to a method of producing granule type chewing gum with various colors and tastes. In particular, the present invention relates to a method of producing chewing gum which is round-shaped or grain-shaped, departing from the conventional standardized rectangular shape.

2. Description of the Related Art

Generally, chewing gum available in the market has the shape of an elongated rectangle. Such chewing gum is produced by hardening a mixture in the shape of a standardized elongated rectangle. Specially, material for chewing gum which is completely melted and stirred is cooled in the form of a sheet, solidified, and then cut into the standardized shape by a cutting machine. In cutting the solidified material for chewing gum, a cooling process utilizing nitrogen gas is required to prevent the chewing gum material from sticking on the cutting machine due to the heat generated from the cutting machine. However, using expensive nitrogen gas increases the manufacturing cost of chewing gum and complicates the manufacturing process thereof.

SUMMARY OF THE INVENTION

It is an object of the present invention to provide a method of producing granule type chewing gum which can reduce the manufacturing cost of chewing gum without the necessity of using a cutting machine and nitrogen gas.

It is another object of the present invention to provide a method of producing granule type chewing gum with various colors and tastes by coating the granule type chewing gum with various food materials.

In order to achieve the above objects, there is provided a method of producing granule type chewing gum, which comprises the steps of:

a) melting hard gum base by heating the gum base in a water bath;

b) preparing a mixture of chewing gum by mixing the melted gum base with glucose, citric acid, spices, food colors, and powdered sugar in turn; and c) granulating the mixture of chewing gum by stirring the mixture of chewing gum while keeping the temperature thereof in the range of 40°–80° C. and solidifying the mixture of chewing gum being stirred with the input of the powdered sugar.

DETAILED DESCRIPTION OF EXAMPLES

The following example is further illustrative of the present invention but by no means limits the scope of the present invention.

In preparing a mixture of chewing gum, the mixing order, mixing rate, and mixing temperature of the components of the mixture are shown in Table 1 below.

TABLE 1

| mixing order | mixed material | mixing rate | mixing temperature |
| --- | --- | --- | --- |
| 1 | gum base | 10–35% | 30–85° C. |
| 2 | glucose | 5–35% | 40–80° C. |
| 3 | citric acid | 0.5–1.5% | 15–30° C. |
| 4 | spices | 0.2–1% | 15–30° C. |
| 5 | food colors | 0.01% | 15–30° C. |
| 6 | powdered sugar | 25–80% | 15–80° C. |

The solid gum base is melted at a mixing temperature of 30°–85° C. at a mixing rate of 15–40% by weight. It is preferable that the melting of the gum base is performed by means of heating in a water bath since direct heating of the gum base contained in a receptacle is apt to burn the gum base and to destroy the structure of the gum base. After the gum base is completely melted, it is mixed with liquefied glucose, powdered citric acid, liquefied spices, liquefied food colors, and powdered sugar in turn under the mixing condition shown in Table 1.

After preparation of the mixture of chewing gum is completed, the mixture is conveyed to a mixer for granulating. The mixture of chewing gum is stirred by the mixer with the input of the powdered sugar. At this time, the stirring time, stirring revolution, the input of powdered sugar, and the input temperature are shown in Table 2 below.

TABLE 2

| item | condition |
| --- | --- |
| stirring time | 5–30 minutes |
| stirring revolution | 20–150 revs per minute |
| input of powdered sugar | 20–60% by weight |
| temperature of powdered sugar | 10–50° C. |

The stirring time is adjusted in accordance with the mixing rate of the mixture of chewing gum, and in the example, it is preferable to be about 5–30 minutes. The stirring revolution is also adjusted in accordance with the mixing condition of the mixture. As shown in Table 2, it is preferable to be in the range of 20–150 revs per minute in accordance with the mixing condition of the mixed compositions when the mixture of chewing gum is prepared. Preferably, about 20–60% by weight of the powdered sugar is inputted when the mixture of chewing gum is granulated.

As stirring of the mixture is performed with the input of the powdered sugar under the stirring condition shown in Table 2, the temperature of the mixture becomes lowered to the normal temperature of 10°–20° C., and at the same time, the mixture is gradually solidified, resulting in that granules are formed in the mixture of chewing gum. The granulating process is observed to determine the optimum operating time of the mixer, the optimum temperatures of the mixture, and the input powdered sugar.

The granules of chewing gum having been formed are selectively coated with food materials such as liquefied sugar, liquefied chocolate, etc. so as to improve the marketability of the products with their various colors and flavors.

The granules of chewing gum produced according to the present invention are round-shaped or grain-shaped, and have the size in the range of #2–#60 the Korean standard meshes. Also, they have various colors and tastes since various food additives such as food colors, spices, citric acid are mixed together.

As described above, according to the present invention, the manufacturing cost can be reduced and the manufacturing process can be simplified since the present method can produce granule type chewing gum without the necessity of using a cutting machine for cutting the chewing gum material into the shape of a standardized rectangle, and nitrogen gas for preventing the chewing gum material from sticking on the cutting machine due to the heat generated from the operating cutting machine.

Also, since the chewing gum produced according to the present invention is round-shaped or grain-shaped, departing from the conventional standardized rectangular shape, its flavor can be improved when chewing it. In addition, it has various colors and tastes by coating the granules of chewing gum with various food materials such as liquefied sugar, liquefied chocolate, etc., thereby improving the marketability of the products.

Whereas the present invention has been described in particular relation to the example as described above, it should be understood that other and further modifications, apart from those described or suggested herein may be made within the spirit and scope of this invention.

What is claimed is:

1. A method of producing granule type chewing gum, comprising the steps of:

melting hard gum base by heating the gum base in a water bath;

preparing a mixture of chewing gum by mixing the melted gum base with glucose, citric acid, spices, food colors, and powdered sugar according to the following Table 1;

TABLE 1

| mixing order | mixed material | mixing rate | mixing temperature |
| --- | --- | --- | --- |
| 1 | gum base | 10–35% | 30–85° C. |
| 2 | glucose | 5–35% | 40–80° C. |
| 3 | citric acid | 0.5–1.5% | 15–30° C. |

TABLE 1-continued

| mixing order | mixed material | mixing rate | mixing temperature |
| --- | --- | --- | --- |
| 4 | spices | 0.2–1% | 15–30° C. |
| 5 | food colors | 0.01% | 15–30° C. |
| 6 | powdered sugar | 25–80% | 15–80° C. | continuously stirring the mixture with an input of the powdered sugar under the conditions according to Table 2;

TABLE 2

| item | condition |
| --- | --- |
| stirring time | 5–30 minutes |
| stirring revolution | 20–150 revs per minute |
| input of powdered sugar | 20–60% by weight |
| temperature of powdered sugar | 10–50° C. | granulating the mixture by cooling it to a temperature in the range of 10°–20° C.; while stirring continuously; and solidifying the mixture of chewing gum being stirred with the input of the powdered sugar.

2. A method of producing granule type chewing gum as claimed in claim 1, wherein the granule has a size in a range of 2–60 mesh.

3. A method of producing granule type chewing gum as claimed in claim 1, wherein granulation of a size of 2–60 mesh is performed.

* * * * *